United States Patent
Zhou

(10) Patent No.: US 8,737,055 B2
(45) Date of Patent: May 27, 2014

(54) MOUNTING DEVICE FOR OPTICAL DISK DRIVE

(75) Inventor: Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 161 days.

(21) Appl. No.: 13/248,047

(22) Filed: Sep. 29, 2011

(65) Prior Publication Data

US 2013/0070413 A1 Mar. 21, 2013

(30) Foreign Application Priority Data

Sep. 16, 2011 (CN) .......................... 2011 1 0275062

(51) Int. Cl.
*G06F 1/16* (2006.01)
*G06F 1/18* (2006.01)

(52) U.S. Cl.
CPC ..................................... *G06F 1/187* (2013.01)
USPC ............... 361/679.33; 361/679.58; 312/223.2

(58) Field of Classification Search
USPC ............. 361/679.01, 679.02, 679.31–679.39, 361/679.55–679.58, 724–727, 754; 312/223.1–223.2
See application file for complete search history.

(56) References Cited

U.S. PATENT DOCUMENTS

| 6,721,177 | B1 * | 4/2004 | Wang et al. ............... 361/679.33 |
| 7,363,640 | B2 * | 4/2008 | Wang et al. .................... 720/657 |
| 2006/0164803 | A1 * | 7/2006 | Chen et al. ..................... 361/685 |
| 2012/0154993 | A1 * | 6/2012 | Chuang et al. ........... 361/679.01 |
| 2012/0243167 | A1 * | 9/2012 | Chen et al. ............... 361/679.31 |

* cited by examiner

*Primary Examiner* — Anthony Haughton
*Assistant Examiner* — Ingrid Wright
(74) *Attorney, Agent, or Firm* — Novak Druce Connolly Bove + Quigg LLP

(57) ABSTRACT

A mounting device for fixing an optical disk drive (ODD) includes a latch and a rack including a bottom wall. Two pins extend out from opposite sides of the ODD. A first plate and a second plate extend up from the bottom wall to sandwich the ODD. a tab extends inward from a back end of one of the first and second plates to block a back end of the ODD. An opening and a slot below and communicating with the opening are defined in each of the first and second plates. The latch is pivotally mounted to the first plate adjacent to the slot. The pins of the ODD extend into the slots through the corresponding openings. One of the pins is blocked by the latch.

4 Claims, 3 Drawing Sheets

MOUNTING DEVICE FOR OPTICAL DISK DRIVE

BACKGROUND

1. Technical Field

The present disclosure relates to a device for mounting an optical disk drive.

2. Description of Related Art

An electronic device, such as a computer, is generally equipped with an optical disk drive. Mounting the optical disk drive device to the electronic device with screws is inefficient and always requires a tool, such as a screw drive, which is inconvenient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
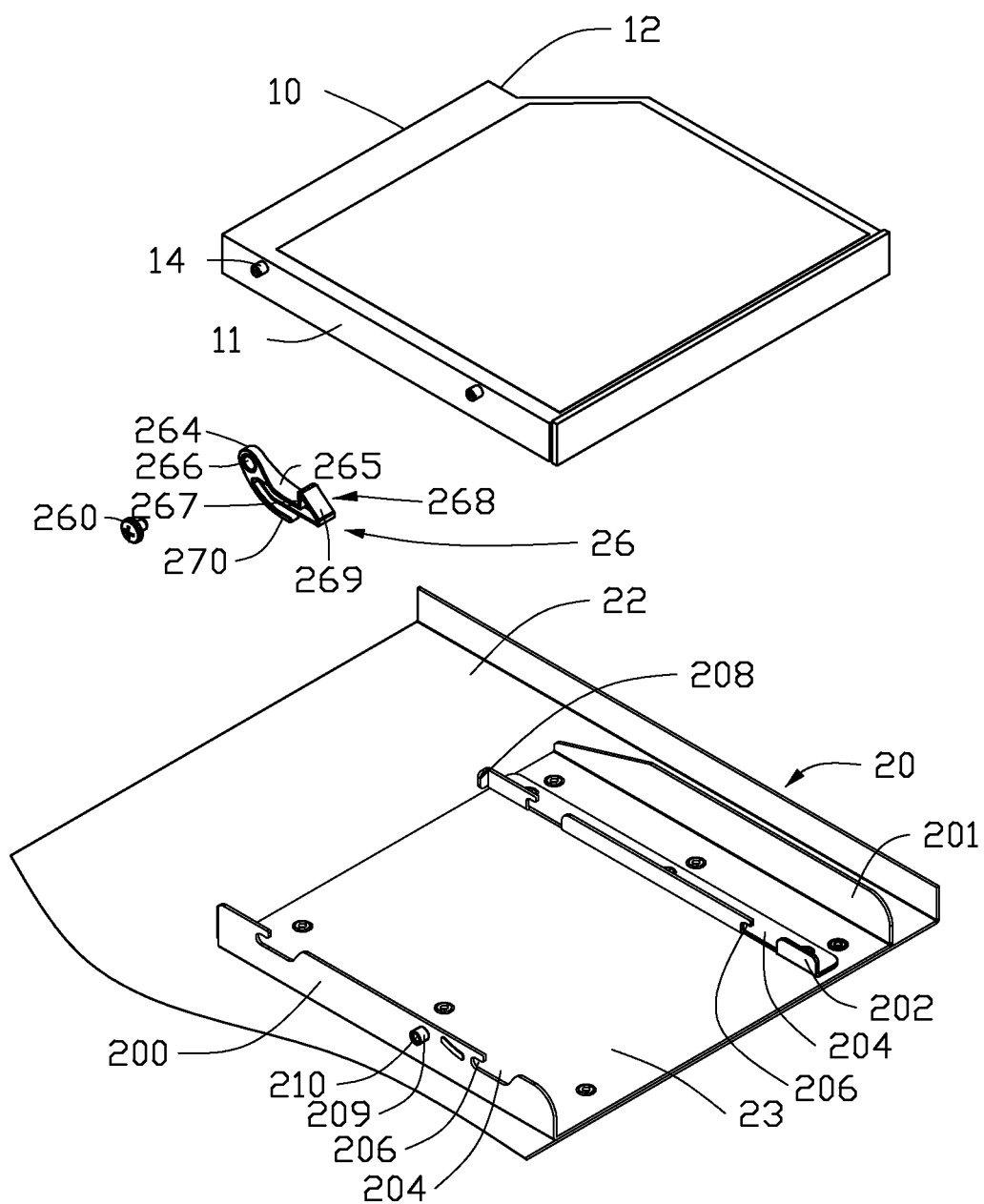
FIG. 1 is an exploded, isometric view of an exemplary embodiment of a mounting device for optical disk drive (ODD), together with an ODD.
Figure 2:
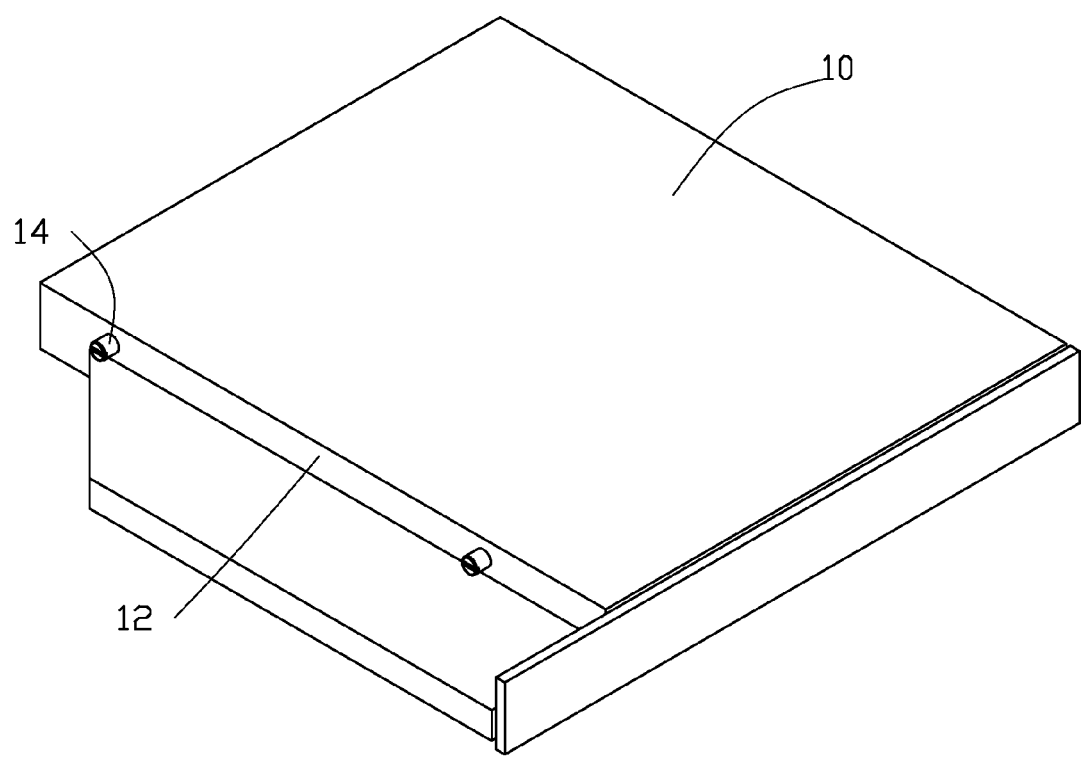
FIG. 2 is an enlarged, inverted view of the ODD of FIG. 1.

Referring to FIGS. 1 and 2, an exemplary embodiment of a mounting device for mounting an optical disk drive (ODD) 10 includes a rack 20 and a fixing member 26.

The ODD 10 includes a first sidewall 11 and a second sidewall 12 opposite to each other. Two pins 14 extend outward from an upper portion of the first sidewall 11. Two pins 14 extend outward from a lower portion of the second sidewall 12.

The rack 20 includes a bottom wall 22 and a bracket 23 mounted on the bottom wall 22. The bracket 23 includes a first plate 200 perpendicular to the bottom wall 22, a second plate 201 parallel to the first plate 200, and a third plate 202 parallel to the first plate 200 located between the first and second plates 200, 201. The third plate 202 is lower than the first plate 200 and the second plate 201. The first and third plates 200, 202 each define two openings 204 extending through the tops of the corresponding first and third plates 200, 202, and two slots 206 communicating with rear bottom ends of the corresponding openings 204. Two tabs 208 toward each other from back ends of the first and third plates 200, 202. A rod 209 protrudes out from the first plate 200, adjacent to one of the slots 204 away from the corresponding tab 208. The rod 209 axially defines a threaded hole 210.

The fixing member 26 includes a screw 260 and a latch 264. The latch 264 includes a main body 265 and an arm 270 slantingly extending down and forward from a rear end of the main body 265. The main body 265 defines a through hole 266 in the rear end. A projection 268 extends from the front end of the main body 265. The projection 268 includes a blocking surface 267 extending up from the front end of the main body 265, and a guiding surface 269 slantingly extending down and forward from the top of the blocking surface 267.

Figure 3:
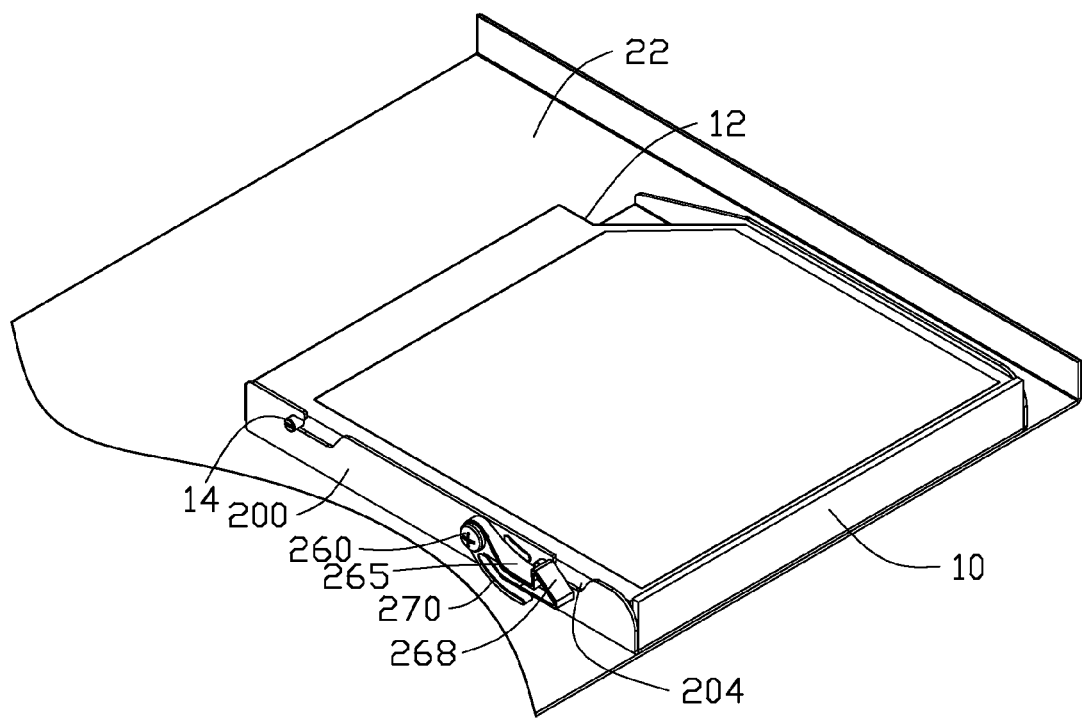
FIG. 3 is an isometric view of the mounting device of FIG. 1 in an assembled state.

Referring to FIG. 3, in assembly, the latch 264 is fitted about the rod 209 through the through hole 266. The screw 260 is screwed into the threaded hole 210, to pivotally mount the latch 264 to the outer surface of the first plate 200. The arm 270 contacts the bottom wall 22. The projection 268 aligns with the opening 204 away from the corresponding tab 208.

In installing the ODD 10 to the rack 20, the ODD 10 is put between the first and second plates 200, 201. The first sidewall 11 abuts against the first plate 200, and the second sidewall 12 abuts against the third plate 202. The pins 14 are inserted into the corresponding openings 204. The ODD 10 is moved backward toward the corresponding slots 206. The pin 14 engages in the opening 204 aligning with the projection 268 is slid on the guiding surface 269 to press the main body 265 downward to deform the arm 270, until the pin 14 engages in the corresponding slot 206. The other pins 14 are all engaged in the corresponding slots 206. The arm 270 is restored then to move the projection 268 up to block the corresponding pin 14 through the blocking surface 267. The back end of the ODD 10 abuts against the tabs 208.

When uninstalling the ODD 10, the projection 268 is pressed down to deform the arm 270 until the projection 268 disengages from the corresponding pin 14. The ODD 10 is moved forward and then upward to be disengaged from the rack 20.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. A mounting device for fixing an optical disk drive (ODD), which has two sidewalls each forming a pin; the mounting device comprising:

a rack comprising a bottom wall, a first plate and a second plate perpendicularly extending up from the bottom wall to sandwich the ODD, a tab extending from a front end of one of the first and second plates to block a back end of the ODD, each of the first and second plates defining an opening extending through a top of the one of the first and second plates, and a slot extending from a rear bottom end of the opening and communicating with the opening, wherein the pins of the ODD respectively extend through the openings to engage in the corresponding slots; and a latch movably mounted to the first plate to block the pin engaged in the corresponding slot of the first plate;

wherein the latch comprises a main body pivotally mounted to the outer surface of the first plate, a projection extends from a front end of the main body and aligns with the corresponding opening of the first plate, to block the corresponding pin in the slot of the first plate; and wherein the latch further comprises an arm slantingly extending down and forward from a rear end of the main body and contacting the bottom wall, when the pin is entering the slot in the first plate, the pin presses the projection to deform the arm together with the bottom wall, after the pin enters the slot, the arm is restored to make the projection block the pin.

2. The mounting device of claim 1, wherein the projection comprises a blocking surface extending up from the front end of the main body to block the pin, and a guiding surface slantingly extending down and forward from the top of the blocking surface on which the pin moves to deform the arm.

3. The mounting device of claim 1, further comprising a screw, wherein a rod protrudes out from the first plate and axially defines a threaded hole, the main body is fitted about the rod, the screw is screwed in the threaded hole to pivotally mount the latch to the first plate.

4. A mounting device for fixing an optical disk drive (ODD), which has two sidewalls each forming a pin; the mounting device comprising:
- a rack comprising a bottom wall, a first plate and a second plate perpendicularly extending up from the bottom wall to sandwich the ODD, a tab extending from a front end of one of the first and second plates to block a back end of the ODD, each of the first and second plates defining an opening extending through a top of the one of the first and second plates, and a slot extending from a rear bottom end of the opening and communicating with the opening, wherein the pins of the ODD respectively extend through the openings to engage in the corresponding slots;
- a latch movably mounted to the first plate to block the pin engaged in the corresponding slot of the first plate; and
- a screw;
- wherein the latch comprises a main body pivotally mounted to the outer surface of the first plate, a projection extends from a front end of the main body and aligns with the corresponding opening of the first plate, to block the corresponding pin in the slot of the first plate; and
- wherein a rod protrudes out from the first plate and axially defines a threaded hole, the main body is fitted about the rod, the screw is screwed in the threaded hole to pivotally mount the latch to the first plate.

\* \* \* \* \*